(12) United States Patent
Kimura

(10) Patent No.: US 8,085,456 B2
(45) Date of Patent: Dec. 27, 2011

(54) SCANNING OPTICAL SYSTEM

(75) Inventor: Kazumi Kimura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 12/414,184

(22) Filed: Mar. 30, 2009

(65) Prior Publication Data
US 2009/0185252 A1 Jul. 23, 2009

Related U.S. Application Data

(62) Division of application No. 10/734,210, filed on Dec. 15, 2003, now Pat. No. 7,525,709.

(30) Foreign Application Priority Data

Dec. 24, 2002 (JP) .................................. 2002-372281

(51) Int. Cl.
G02B 26/08 (2006.01)

(52) U.S. Cl. ................... 359/204.1; 359/216.1; 347/261

(58) Field of Classification Search .... 359/204.1–204.2, 359/204.4, 216.1–219.1, 204.3, 204.5, 741; 347/243–244, 261, 241, 256, 258–260
See application file for complete search history.

(56) References Cited

U.S. PATENT DOCUMENTS

| | | | | |
|---|---|---|---|---|
| 5,450,119 A | 9/1995 | Hinton et al. | ................. | 347/242 |
| 5,566,006 A | 10/1996 | Yoshinaga et al. | ............ | 358/475 |
| 5,963,356 A | 10/1999 | Kato | ............................ | 359/216 |
| 6,141,118 A | 10/2000 | Yamawaki et al. | ........... | 358/481 |
| 6,292,285 B1 | 9/2001 | Wang et al. | ................... | 359/204 |
| 6,313,906 B1 | 11/2001 | Nagasaka et al. | ................ | 355/67 |
| 6,469,774 B1 | 10/2002 | Kimura | ............................ | 355/67 |
| 6,549,332 B2 | 4/2003 | Kimura | .......................... | 359/366 |
| 7,012,723 B2 | 3/2006 | Yoshikawa et al. | ........... | 359/204 |
| 2003/0072042 A1* | 4/2003 | Koreeda | ......................... | 358/505 |
| 2003/0137710 A1* | 7/2003 | Nishikiuchi et al. | ........... | 359/204 |
| 2003/0193703 A1* | 10/2003 | Takakubo | ...................... | 359/207 |

FOREIGN PATENT DOCUMENTS

| | | |
|---|---|---|
| JP | 2058014 | 2/1990 |
| JP | 7-281113 | 10/1995 |
| JP | 9258126 | 10/1997 |
| JP | 11-109265 | 4/1999 |
| JP | 11119131 | 4/1999 |

* cited by examiner

*Primary Examiner* — James Phan
(74) *Attorney, Agent, or Firm* — Fitzpatrick, Cella, Harper & Scinto

(57) ABSTRACT

An object of the present invention is to provide a scanning optical system capable of reducing the number of its components and its size with a simple construction, and an image forming apparatus using the scanning optical system. In a specific scanning optical system, a plurality of light beams emitted from a plurality of light source units are deflected and scanned by a plurality of different deflecting facets of a common optical deflecting unit, and a plurality of scanned surfaces are scanned with the light beams deflected and scanned by the different deflecting facets, respectively. In the scanning optical system, the number of the light source units is 4n, the number of the light beams is 4nm (n and m are positive integers, respectively), incidence optical paths of the light beams incident on the optical deflecting unit are symmetrically disposed with respect to a first cross section and a second cross section which are perpendicular to each other, the first cross section is parallel to a rotational axis of the optical deflecting unit, and the second cross section is perpendicular to the rotational axis of the optical deflecting unit.

7 Claims, 8 Drawing Sheets

SCANNING OPTICAL SYSTEM

RELATED APPLICATIONS

This application is a division of U.S. patent application Ser. No. 10/734,210, filed Dec. 15, 2003, now U.S. Pat. No. 7,525,709, which is incorporated by reference herein in its entirety, as if fully set forth herein, and claims the benefit of priority under 35 U.S.C. §119, based on Japanese Priority Application No. JP 2002-372281, filed Dec. 24, 2002, which is incorporated by reference herein in its entirety, as if fully set forth herein.

BACKGROUND OF THE INVENTION

1. Field of the Invention

The present invention relates to a scanning optical system and an image forming apparatus using the scanning optical system, and particularly to scanning optical systems suitably usable in image forming apparatuses, such as laser beam printers, digital copying machines, and multi-function printers that employ electrophotographic process, for example, in which a plurality of light beams emitted by a plurality of light source units are deflected by a polygon mirror serving as a optical deflecting unit, are transmitted through an image forming optical system having f-θ characteristics, and are scanned on a surface to be scanned (a scanned surface) to record image information thereon.

2. Related Background Art

Construction and optical function of a conventional scanning optical system will be described with reference to FIGS. 12 to 14.

FIG. 12 illustrates an image forming apparatus for printing a color image, which includes four independent image bearing members (also referred to as a photosensitive drum) corresponding to colors of Y (yellow), M (magenta), C (cyan) and Bk (black), respectively.

In FIG. 12, reference numeral 20 designates a photosensitive drum. In the photosensitive drum 20, an electrically conductive body is coated with a photosensitive layer, and an electrostatic latent image is formed thereon by a light beam emitted from a scanning optical portion contained in an optical box 21. The scanning optical portion emits plural light beams based on image information supplied from an image reading apparatus (not shown), a personal computer (not shown), or the like. Reference numeral 22 designates a developing unit for forming a toner image on the photosensitive drum 20 with frictional electrified toner. Reference numeral 23 designates an intermediate transferring belt for carrying the toner image on the photosensitive drum 20 to a transferring paper. Reference numeral 24 designates a sheet feeding cassette for containing sheets of paper on which the toner image is transferred. Reference numeral 25 designates a fixing unit for causing adsorption of the toner image transferred on the paper into the paper by heat. Reference numeral 26 designates a sheet discharging tray on which the fixed transferring paper is carried. Reference numeral 27 designates a cleaner for cleaning toner remaining on the photosensitive drum 20.

In connection with image formation, four light beams emitted from the scanning optical portion based on image information are projected on corresponding photosensitive drums, respectively, and electrostatic latent images are thus formed on these photosensitive drums electrified by the electrifying units, respectively. After that, toners frictionally electrified in the developing devices 22 are attached to the electrostatic latent images, and toner images are thus formed on the photosensitive drums 20. The toner images are transferred to the intermediate transferring belt 23 from the photosensitive drums, respectively, and these toner images are again transferred from the sheet feeding cassette 24 disposed in a lower portion of the apparatus. The image is thus formed on the paper. The image transferred on the paper is fixed by fixation of the toner using the fixing unit 25, and the paper is stacked on the sheet discharging tray.

FIG. 13 is a sub-scanning cross-sectional view of the scanning optical system illustrated in FIG. 12. In FIG. 13, two scanning groups S1 and S2 are disposed symmetrically with respect to a polygon mirror 28 serving as the deflecting unit in a horizontal direction. Optical functions of those two scanning groups S1 and S2 are the same, and accordingly the following description is made to the scanning group S1 on the right side only.

In the scanning optical system in FIG. 13, plural light beams emitted based on the image information are guided onto the photosensitive drums 20a and 20b through the polygon mirror 28 for deflecting and scanning the light beams, first and second f-θ lenses 29 and 30 for scanning the light beams at uniform velocity and forming spot images on the photosensitive drums, a plurality of reflecting mirrors 31a to 31d for reflecting the light beams toward predetermined directions, and dust-proof glasses 32 for protecting the scanning optical portion from dust, respectively. The latent images are thus formed on the photosensitive drums 20a and 20b, respectively.

In recent years, as the size of the image forming apparatus decreases, the scanning optical system comes to adopt a system in which four photosensitive drums are scanned with and exposed to light beams from a single polygon mirror (a polygon motor unit), respectively, as illustrated in FIG. 13. This system includes two scanning groups S1 and S2 for projecting plural light beams to opposing facets of the polygon mirror, respectively.

Each of the two scanning groups S1 and S2 causes two light beams shifted in the vertical direction a predetermined distance in a parallel manner to be incident on the deflection facet (reflecting facet) of the polygon mirror 28, such that the two light beams can be deflected and scanned. Further, there are provided first and second f-θ lenses 29 and 30 for imaging two light beams E1 and E2 in those upper and lower optical paths on the photosensitive drums 20a and 20b. Each of the first and second f-• lenses 29 and 30 has two identical lens surfaces provided on upper and lower stages. Each of those lenses can be produced by cementing two lenses, or by forming a mold lens in a united form.

The above-discussed conventional apparatus, however, has the following disadvantages.

The first disadvantage is that optical components are independently provided on respective optical paths from plural light sources to the optical deflecting unit for the respective light beams, and accordingly the number of optical components is large. The number of optical components must be decreased to achieve further reduction of costs.

In the two-stage scanning optical system as illustrated in FIG. 13, it is necessary to provide a deflecting facet for deflecting and scanning light beams in the respective optical paths, and hence a thick polygon mirror, or a two-stage polygon mirror is used. In this system, load imposed on a motor for driving the large-sized polygon mirror tends to increase.

In contrast therewith, there has been proposed an oblique incidence scanning optical system using a thinned polygon mirror. In this system illustrated in FIG. 14, laser light beams are caused to be incident on the polygon mirror at different angles in the sub-scanning cross section such that the polygon mirror can be thinned in the vertical direction. Such a scanning optical system in which the laser light beams are caused to be incident on the polygon mirror at different angles in the sub-scanning cross section is generally called an oblique-incidence system. In FIG. 14, each laser light deflected and scanned by the polygon mirror is transmitted through common f-• lenses 35 and 36, and projected on the photosensitive drum through two folding mirrors and a concave mirror 34b or 34e.

Scanning optical systems using such an oblique-incidence system are disclosed in Japanese Patent Application Laid-Open Nos. H02-58014, H09-258126, and H11-119131, for example.

In the system of Japanese reference H02-58014, cylindrical lenses on a front side of the optical deflecting unit are separately provided, and consideration for further reduction in the number of optical elements and reduction in cost is insufficient. On the other hand, Japanese reference H09-258126 discloses a system in a cylindrical lens is commonly used, but influence of spherical aberration of the cylindrical lens threatens to occur since the light beam passes through a decentering portion of the cylindrical lens from the optical axis.

The second disadvantage is a method in the oblique-incidence system for separating light beams deflected by the optical deflecting unit from each other in a space between the optical deflecting unit and the scanned surface. Japanese reference H11-119131 discloses a method for coping with such a problem, in which the light beams incident on the deflecting facet from an upper side and a lower side are separated on the deflecting facet, and optical-path separation on a rear side of the optical deflecting unit is hence facilitated. In this system, however, the optical system on the light source side of the optical deflecting unit is liable to be arranged in a cramped fashion. Accordingly, a sufficient space must be secured by making the light source unit remote from the optical deflecting unit, and it is hence difficult to achieve a compact structure.

SUMMARY OF THE INVENTION

It is an object of the present invention to provide a scanning optical system capable of reducing the number of its components and its size with a simple construction, and an image forming apparatus using the scanning optical system.

In a scanning optical system according to the present invention, a plurality of light beams emitted from a plurality of light source units are deflected and scanned by a plurality of different deflecting facets of a common optical deflecting unit, and a plurality of scanned surfaces are scanned with the light beams deflected and scanned by the different deflecting facets, respectively. Further, in the scanning optical system, the number of the light source units is 4 n, the number of the light beams is 4 nm (n and m are positive integers, respectively), incidence optical paths of the light beams incident on the optical deflecting unit are symmetrically disposed with respect to a first cross section and a second cross section which are perpendicular to each other, the first cross section is parallel to a rotational axis of the optical deflecting unit, and the second cross section is perpendicular to the rotational axis of the optical deflecting unit.

These and further aspects and features of the invention will become apparent from the following detailed description of preferred embodiments thereof in conjunction with the accompanying drawings.

DESCRIPTION OF THE PREFERRED EMBODIMENTS

First Embodiment

Figure 1:
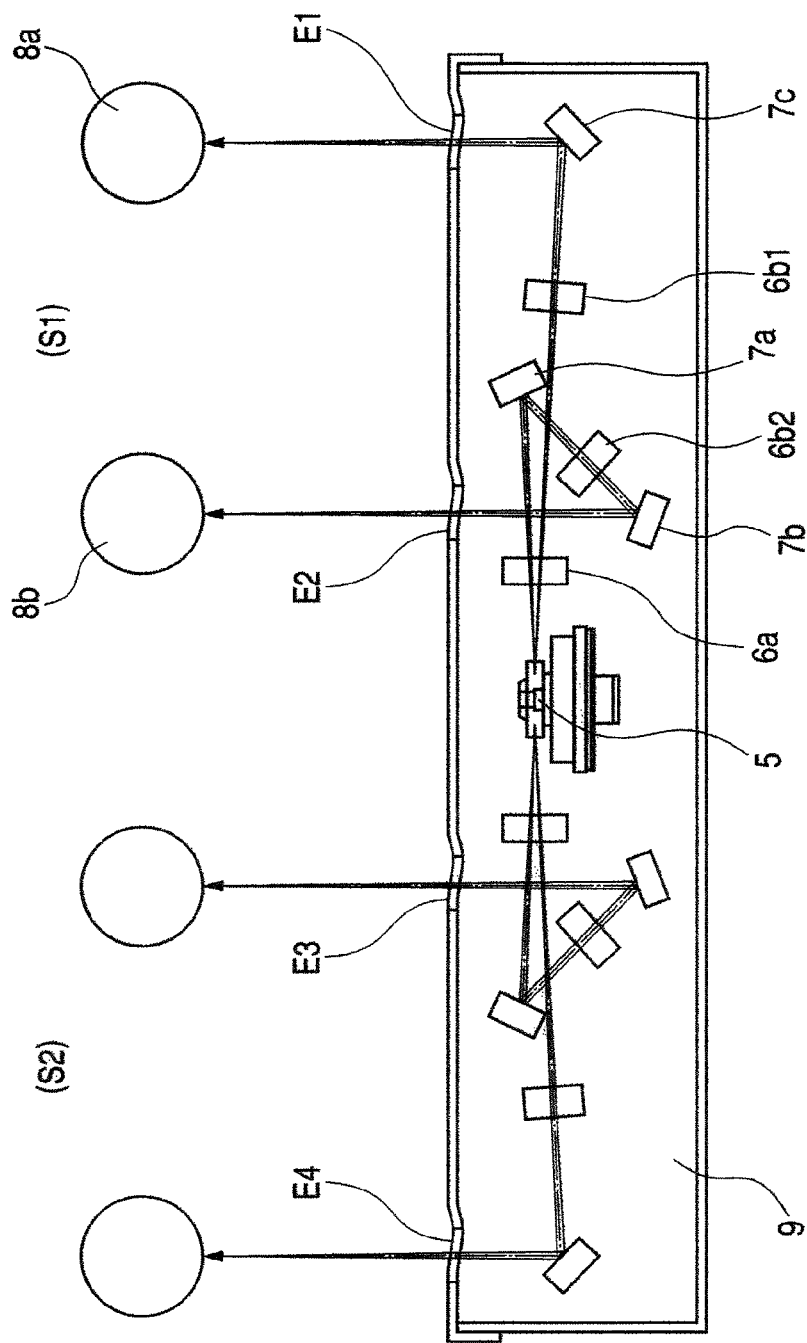
FIG. 1 is a cross-sectional view in a sub-scanning direction illustrating a first embodiment according to the present invention.
Figure 2:
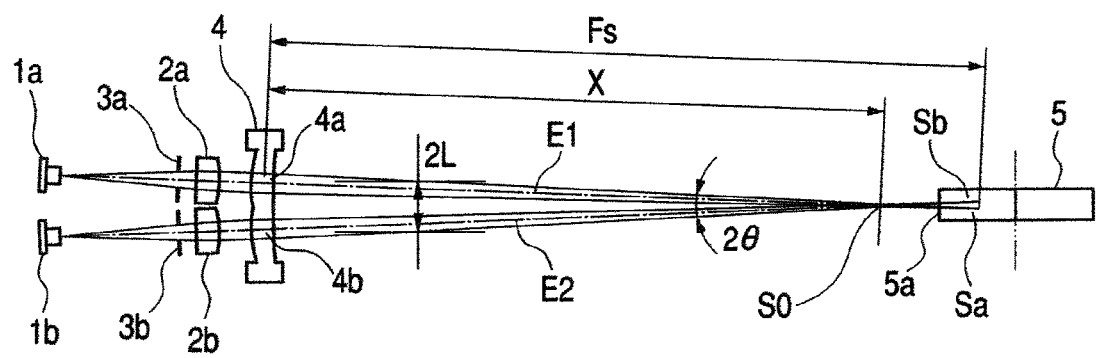
FIG. 2 is a cross-sectional view in a sub-scanning direction illustrating an incidence optical system in the first embodiment according to the present invention.

FIGS. 1 and 2 are cross-sectional views of a first embodiment of a scanning optical system according to the present invention, respectively. FIG. 1 is a cross-sectional view in a sub-scanning direction illustrating the scanning optical system from an optical deflecting unit to a surface of a photosensitive drum. FIG. 2 is a cross-sectional view in the sub-scanning direction illustrating the scanning optical system from a light source unit to the optical deflecting unit.

Here, the main scanning direction designates a direction perpendicular to a rotational axis of the deflecting unit and an optical axis of an imaging optical system (i.e., a direction along which a light beam is reflectively deflected (deflection-scanned) by the deflecting unit), and the sub-scanning direction designates a direction parallel to the rotational axis of the deflecting unit. Further, a main scanning cross section designates a plane parallel to the main scanning direction and including the optical axis of the imaging optical system. A sub-scanning cross section designates a plane perpendicular to the main scanning cross section and parallel to the optical axis of the imaging optical system.

In the first embodiment, plural light beams emitted by plural light source units are divided into two groups guided to two scanning groups S1 and S2, respectively. Those two scanning groups S1 and S2 are disposed symmetrically with respect to a polygon mirror 5 serving as the deflecting unit in a horizontal direction (in right and left directions). Optical functions of those two scanning groups S1 and S2 are the same, and accordingly the following description is made to the scanning group S1 on the right half side only.

In FIG. 1, reference numeral 5 designates an optical deflecting unit which is comprised of a rotatable polygon mirror which is rotated at a uniform speed by a driving unit (not shown) such as a motor. Reference numerals 8a and 8b designate photosensitive drums, respectively. In each of the photosensitive drums 8a and 8b, an electrically conductive body is coated with a photosensitive layer, and an electrostatic latent image is formed thereon by a light beam emitted from an optical scanning portion contained in an optical box 9.

In this embodiment, when each element and each light beam are projected on the sub-scanning cross section, two light beams are obliquely incident on the deflecting facet of the polygon mirror 5 at predetermined angles (an obliquely-incidence scanning optical system).

Reference numeral 6a designates a first imaging lens which is comprised of an anamorphic aspherical lens having refractive force (power) mainly in the main scanning direction. Two light beams enter this imaging lens 6a. The lens surface profile of the first imaging lens 6a in the main scanning direction is an aspherical profile that can be represented by a known function. The first imaging lens 6a is non-power or approximately non-power in the sub-scanning direction. For example, each of both opposite surfaces of the first imaging lens 6a has a flat cylindrical shape in the sub-scanning direction. The first imaging lens 6a mainly shares uniform speed scanning and imaging in the main scanning direction for the incident light beam thereon.

Reference numerals 6b1 and 6b2 designate second imaging lenses, respectively. Each of the second imaging lenses 6b1 and 6b2 is comprised of an anamorphic aspherical lens having power mainly in the sub-scanning direction. The lens surface profile of each second imaging lens in the main scanning direction is an aspherical profile that can be represented by a known function. Power of each second imaging lens 6b in the main scanning direction is smaller than power of the first imaging lens 6a. Each of the second imaging lenses 6b1 and 6b2 mainly shares imaging in the sub-scanning direction and correction of small distortion in the main scanning direction for each incident light beam thereon.

In this embodiment, the first imaging lens 6a and the second imaging lens 6b1 constitute a first imaging optical system, and the first imaging lens 6a and the second imaging lens 6b2 constitute a second imaging optical system. The first and second imaging optical systems form images of light beams E1 and E2 based on image information and reflectively deflected by the polygon mirror 5 on the photosensitive drums 8a and 8b each serving as the scanned surface, respectively. Further, each of the first and second imaging optical systems establish conjugate relationship between the deflecting facet of the polygon mirror 5 and each of surfaces of the photosensitive drums 8a and 8b in the sub-scanning cross section, and fall or inclination compensation function is hence achieved.

Reference numerals 7a and 7b designate first and second reflecting mirrors, respectively. Each reflecting mirror is disposed in the optical path of the light beam E2, and reflects the light beam in a predetermined direction. Reference numeral 7c designates a third reflecting mirror. The third reflecting mirror 7c is disposed in the optical path of the light beam E1, and reflects the light beam in a predetermined direction.

In FIG. 2, reference numerals 1a and 1b designate light source units, respectively. Each light source unit is comprised of a semiconductor laser, for example. Reference numerals 3a and 3b designate aperture stops, respectively. The aperture stops 3a and 3b restrict two light beams (light amounts) emitted from the light source units 1a and 1b, respectively. Reference numerals 2a and 2b designate light condensing lenses (collimator lenses), respectively. Two light beams restricted by the aperture stops 3a and 3b are converted into nearly parallel light beams (each light beam can be a convergent light beam, or a divergent light beam) by the light condensing lenses 2a and 2b, respectively. The light source units 1a and 1b, the aperture stops 3a and 3b, the collimator lenses 2a and 2b, and the like are arranged at upper and lower stages in the sub-scanning cross section, and are disposed on optical paths forming desired angles $\pm\theta$ relative to the deflecting facet in the main scanning cross section, respectively.

Reference numeral 4 designates a compound imaging element. The imaging element 4 is constructed by uniting cylindrical lenses serving as the optical element, and disposed between the light source units 1a and 1b and the polygon mirror 5. In the first embodiment, each of the cylindrical lenses 4a and 4b is comprised of an anamorphic lens having power (its focal length Fs) in the sub-scanning cross section only, is provided for each light beam, and forms an approximately linear image of the light beam transmitted through each of the collimator lenses 2a and 2b on or on places close to the deflecting facet of the polygon mirror 5 in the sub-scanning cross section. Further, the light incidence surface and the light emergence surface of each of the cylindrical lenses 4a and 4b have a cylindrical profile (an anamorphic surface) and a plane profile, respectively. In this embodiment, the distance between optical axes of the cylindrical lenses 4a and 4b in the compound imaging element 4 is set to a length 2L.

Each of the aperture stops 3a and 3b, the collimator lenses 2a and 2b, the cylindrical lenses 4a and 4b, and the like constitutes one element of the light incidence optical system.

The scanning optical system of this embodiment is the obliquely-incidence scanning optical system as discussed above. The obliquely-incidence scanning optical system is an optical system in which a light beam is incident obliquely relative to a plane (the main scanning cross section) perpendicular to the rotational axis of the polygon mirror 5 in the sub-scanning cross section (a plane parallel to the sheet of FIG. 2) as illustrated in FIG. 2. Due to such oblique incidence, upper and lower optical paths of plural light beams can be readily separated from each other on a rear side of the emergence from the polygon mirror 5.

Functions of the scanning optical system of the first embodiment are as follows.

In this embodiment, light beams emitted from the semiconductor lasers 1a and 1b and modulated based on image information are restricted (light amounts of the light beams are limited) by the aperture stops 3a and 3b, are converted into approximately parallel light beams by the collimator lenses 2a and 2b, and are incident on the cylindrical lenses 4a and 4b, respectively. The approximately parallel light beams incident on the cylindrical lenses 4a and 4b are emitted therefrom without any changes in the main scanning cross section. Those light beams are converged and imaged as approximately linear images (linear images extending in the main scanning direction) on or on places close to the deflecting facet 5a of the deflecting unit (the polygon mirror) 5 in the sub-scanning cross section, respectively.

The light beams E1 and E2 incident on the deflecting facet 5a of the polygon mirror 5 are reflected at angles ±θ in the main scanning cross section, respectively, and are thus defected and scanned. Thereafter, the light beams E1 and E2 are commonly incident on the first imaging lens 6a. The light beams E1 and E2 transmitted through the first imaging lens 6a are separated into respective optical paths by the first reflecting mirror 7a. The light beam E2 reflected by the first reflecting mirror 7a is transmitted through the second imaging lens 6b2, and is then reflected upward (on the sheet of FIG. 1) by the second reflecting mirror 7b. The light beam E2 thus intersects the optical path of itself in the space. The light beam E2 is folded by the first and second reflecting mirrors 7a and 7b, hence intersects the optical path of another light beam E1 twice, and reaches the photosensitive drum 8b.

On the other hand, the light beam E1 transmitted through the first imaging lens 6a on its optical path passes near the first reflecting mirror 7a, and its optical path is separated from the optical path of the light beam E2. The light beam E1 is transmitted through the second imaging lens 6b1, then reflected upward (on the sheet of FIG. 1) by the third reflecting mirror 7c, and reaches the photosensitive drum 7a.

In this embodiment, the first imaging lens 6a is commonly used by the two light beams E1 and E2, while the second imaging lenses 6b1 and 6b2 are used by the two light beams E1 and E2, respectively. The first reflecting mirror 7a is disposed on the right side of the optical path of the light beam E2 directed to the photosensitive drum 8b, namely, on the side of this optical path opposite to the side of the polygon mirror 5 as illustrated in FIG. 1. Further, the first reflecting mirror 7a is disposed on the side nearer the photosensitive drums 8a and 8b than the polygon mirror 5 is, with respect to the vertical direction in FIG. 1. In other words, the first reflecting mirror 7a is disposed in a space between the second reflecting mirror 7b and the photosensitive drums 8a and 8b. Further, the light beam E2 incident on the first reflecting mirror 7a is reflected in a direction away from the photosensitive drums 8a and 8b (in a direction opposite to the photosensitive drums 8a and 8b), and in a direction approaching the polygon mirror 5.

The second reflecting mirror 7b is disposed in a space between the polygon mirror 5 and the first reflecting mirror 7a as illustrated in FIG. 1, and is constructed so as to reflect the light beam E2 incident thereon toward the photosensitive drum 8b. In such a structure, the optical paths can be arranged using the space in an overlapping way, and the number of mirrors used therein can be made smaller than that of the conventional apparatus. The size of the entire apparatus can be hence made small.

Further, in the first embodiment, the space created between the first reflecting mirror 7a and the second reflecting mirror 7b can be effectively used since the second imaging lens 6b2 is disposed in the space between the first reflecting mirror 7a and the second reflecting mirror 7b. Thereby, a compact apparatus can be constructed.

[Optical Arrangement of the Incidence Optical System]

Figure 3:
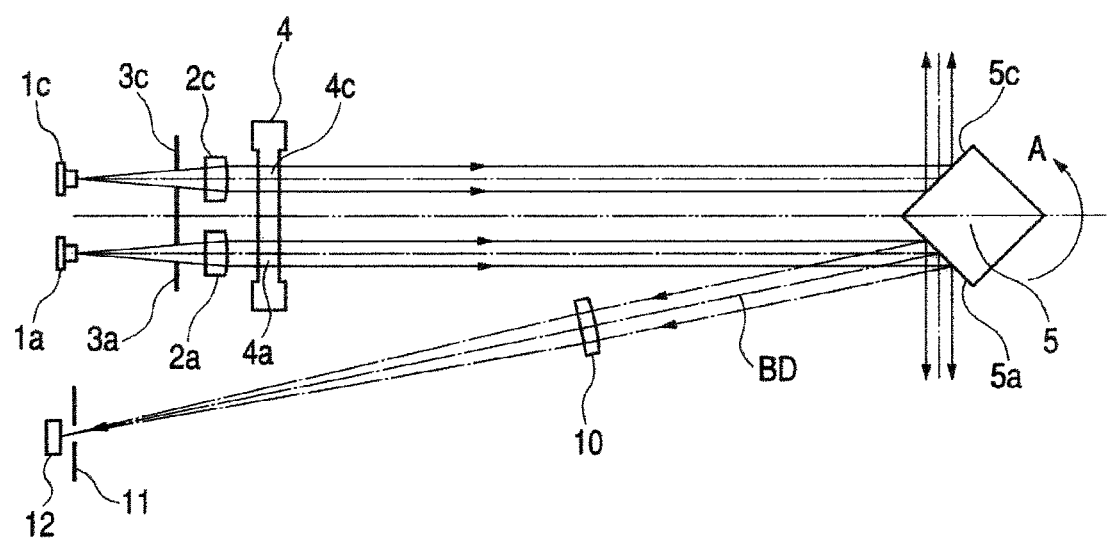
FIG. 3 is a cross-sectional view in a main scanning direction illustrating the incidence optical system in the first embodiment according to the present invention.
Figure 4:
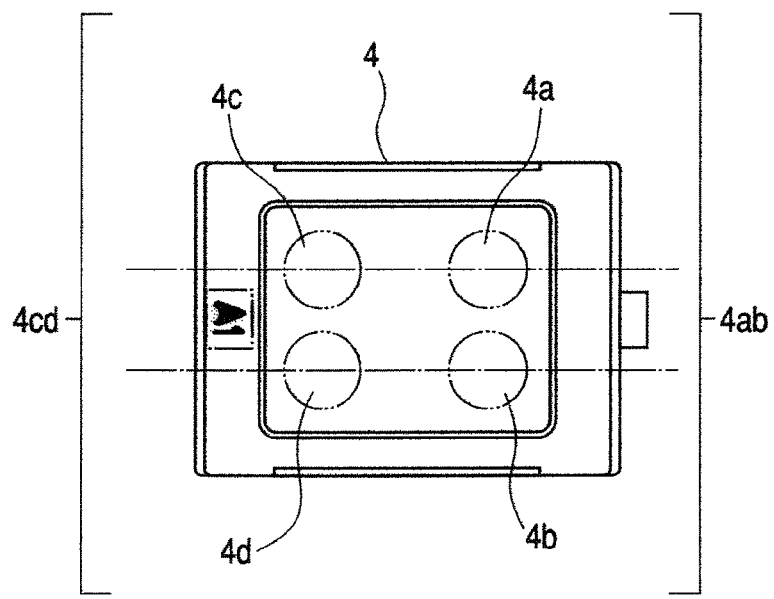
FIG. 4 is a front view illustrating a compound imaging element in a first embodiment according to the present invention.

The optical arrangement of the incidence optical system from the light source unit to the polygon mirror as illustrated in FIG. 2 will be described with reference to FIGS. 3 and 4. FIG. 3 is a cross-sectional view in the main scanning direction of FIG. 2 illustrating a main portion. FIG. 4 is a front view illustrating the compound imaging element. The light source unit 1c, the aperture stop 3c, the collimator lens 2c, and the cylindrical lens 4c in FIG. 3 are not illustrated in FIG. 2 since they are arranged on the side beyond the light source unit 1a, the aperture stop 3a, the collimator lens 2b, and the cylindrical lens 4b in FIG. 2. Conversely, the light source unit 1b, the aperture stop 3b, the collimator lens 2b, and the cylindrical lens 4b in FIG. 2 are not illustrated in FIG. 3 since they are arranged on the side beyond the light source unit 1a, the aperture stop 3a, the collimator lens 2a, and the cylindrical lens 4a in FIG. 3.

In this embodiment, the optical paths of the two light beams E1 and E2 emitted from the light source units 1a and 1b are crossed at a location So away from the cylindrical lenses 4a and 4b by a distance X, as illustrated in FIG. 2. Linear images are thus formed at locations (imaging locations) 5a and Sb close to the deflecting facet 5a of the polygon mirror 5.

As is apparent from FIG. 2, the distance 2L between optical axes of the cylindrical lenses 4a and 4b in the sub-scanning cross section is narrower than the distance between optical axes of the collimator lenses 2a and 2b in the sub-scanning cross section. Accordingly, it is difficult to arrange the respective cylindrical lenses 4a and 4b independently from each other.

In this embodiment, therefore, the cylindrical lenses 4a and 4b are constructed in a united form in the sub-scanning cross section to form the compound imaging element 4 as discussed above so that the above problem can be solved. The compound imaging element 4 can be simultaneously produced by a molding method, such as injection molding, using a mold. Accordingly, a plurality of optical functional components can be highly precisely disposed in a narrow space. Further, reduction in cost due to the simultaneous molding can be expected.

In FIG. 3, the light beam emitted from the light source unit 1a is deflected and scanned by the polygon mirror 5 rotating in a direction A indicated by an arrow. A portion of the light beam (BD beam) at a scanning upstream location is condensed at a place close to a slit (a BD slit) 11 for synchronous detection by an imaging lens (a BD lens) 10 serving as a synchronous detecting optical element, and guided to a light receiving element (a BD sensor) 12 for synchronous detection. This is a so-called synchronous detecting optical system (a BD optical system). The BD sensor 12 has well-known function for determining timing in which writing by a scanning light beam in the main scanning direction is started on the photosensitive drum.

In FIG. 3, the BD optical system is provided for the light source unit 1a only. Thus, in contrast with a structure in which BD optical systems are provided for light source units, respectively, the BD optical system is provided for a light source unit 1a only, and other light source units are driven being delayed by time differences relative to the light source unit 1a, respectively, in this embodiment. The number of BD optical systems can be thus reduced, and the entire apparatus can be hence constructed readily.

Further, in FIG. 3, the cylindrical lenses 4a and 4c arranged in the main scanning cross section are formed in a united form. Since the cylindrical lenses 4a and 4b arranged in the sub-scanning cross section are also formed in a united form, cylindrical lenses 4a to 4d are shaped into the compound imaging element 4 having a structure as illustrated in FIG. 4. As discussed above, the compound imaging element 4 can be simultaneously produced by the molding method, such as injection molding, using the mold.

In the first embodiment, incidence optical paths of four light beams incident on the polygon mirror 5 are disposed symmetrically with respect to the sub-scanning cross section including the rotational axis of the polygon mirror 5 and the main scanning cross section perpendicular to the rotational axis of the polygon mirror 5. Further, relative angles between the light beams incident on the deflecting facet of the polygon mirror 5 in the main scanning cross section and the sub-scanning cross section are made different from each other.

In other words, in the first embodiment, incidence optical paths of four light beams incident on the polygon mirror 5 are disposed symmetrically with respect to a first cross section and a second cross section, respectively. The first and second cross sections are perpendicular to each other, and the first cross section is parallel to the rotational axis of the polygon mirror 5 while the second cross section is perpendicular to the rotational axis of the polygon mirror 5.

Further, optical axes of the cylindrical lenses 4a to 4d in this embodiment are disposed symmetrically with respect to two mutually perpendicular planes (the main scanning cross section and the sub-scanning cross section), respectively.

To paraphrase the above discussion, as can be understood from FIGS. 2 to 4, four light beams emitted from four light source units 1a to 1d are simultaneously deflected and scanned by different deflecting facets of the same polygon mirror 5, and are scanned on photosensitive drums serving as different scanned surfaces, respectively. And, incidence optical paths of four light beams emitted from the light source units 1a to 1d and incident on the polygon mirror 5 are disposed symmetrically with respect to the sub-scanning cross section (the plane including the rotational axis of the polygon mirror) and the main scanning cross section (the plane perpendicular to the rotational axis of the polygon mirror), respectively. Further, in this embodiment, in the event that four light beams emitted from the light source units 1a to 1d are incident on the deflecting facet of the polygon mirror 5, the light beams are parallel to each other in the main scanning cross section as illustrated in FIG. 3, while the light beams are non-parallel, and form relative angles 2• in the sub-scanning cross section as illustrated in FIG. 2.

Although a light beam is emitted from each of four light source units 1a to 1d (totally four light beams) in this embodiment, the structure is not limited thereto. For example, each of the four light source units 1a to 1d can be replaced by a one-chip monolithic multi-laser light source for emitting plural (m) light beams, or a conventional multi-laser light source including plural (n) laser chips and a beam compounding system. It is possible to speedily perform four-color simultaneous writing by such a multiple light source structure. In such a case, the total number of light beams is 4 m or 4 n (m and n are positive integers, respectively).

In this embodiment, each element is constructed such that the following relations or conditions can be satisfied $$X = L/\sin•$$

and $$0.7 < X/Fs = (L/\sin•)/Fs < 1.3 \qquad (1)$$

where Fs is the focal length of a cylindrical lens constituting the compound imaging element in the sub-scanning cross section, 2• is the relative angle between optical axes of the cylindrical lenses of the compound imaging element 4 in the sub-scanning cross section, 2L is the distance between optical axes of the cylindrical lenses on the compound imaging element 4 in the sub-scanning cross section, and X is the distance from the point So at which optical paths of the two light beams intersect each other to the compound imaging element 4.

For example, when X/Fs=1 is satisfied, positions Sa and Sb coincide with each other, and the height of the polygon 5 can be accordingly minimized. In a range of the above condition (1), the required height of the polygon mirror 5 is satisfactorily usable. However, beyond this range, the height of the polygon mirror 5 becomes large, and cost and load imposed on the driving motor increase.

More preferably, the relation (1) can be re-written as $$0.85 < (L/\sin•)/Fs < 1.15 \qquad (1a)$$

In this embodiment, the cylindrical lenses 4a and 4b are united into a first compound imaging element 4ab as illustrated in FIG. 4, and two beams therefrom are incident on one deflecting facet 5a of the polygon mirror 5. Further, the cylindrical lenses 4c and 4d are united into a second compound imaging element 4cd, and two beams therefrom are incident on another deflecting facet 5c of the polygon mirror 5. As the polygon mirror 5 rotates, those four light beams are simultaneously deflected and scanned, and plural different scanned surfaces are hence scanned with those light beams. Further, the first and second compound imaging elements are united into the compound imaging element 4.

The cylindrical lenses 4a and 4c have cylindrical surfaces of the same shape disposed apart from each other in the main scanning direction, so that these cylindrical lenses can be constructed as a continuous cylindrical surface. In this case, they can be formed in a united form by a specular surface piece. It is naturally possible to construct the cylindrical lenses as separate surfaces by separate specular surface pieces. The same holds with the cylindrical lenses 4b and 4d.

The cylindrical profile of the cylindrical lens is not limited to a circularly arcuate shape, and can be an aspherical shape. Further, the shape of the light emergence surface is also not limited to a plane shape. It can have a shape formed by performing mutual bending with the shape of the incidence surface such that desired powers in the main scanning and sub-scanning directions can be resultantly achieved.

Second Embodiment

Figure 5:
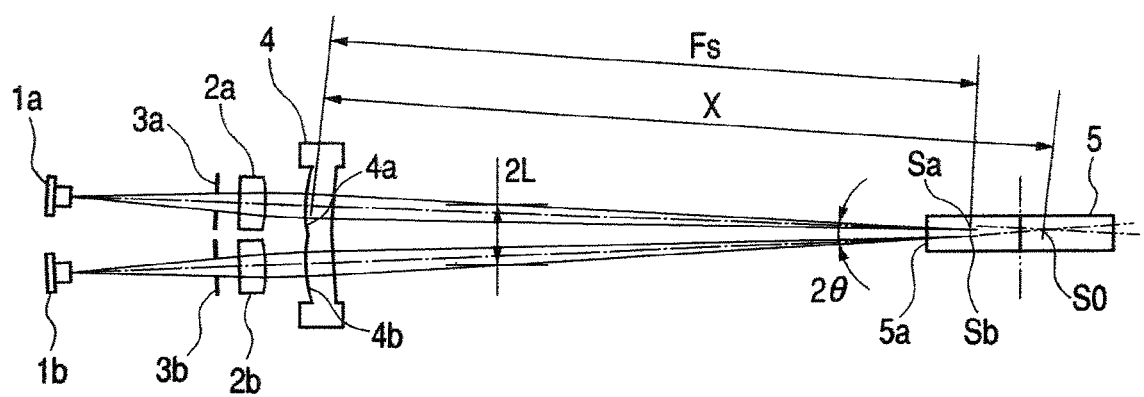
FIG. 5 is a cross-sectional view in a sub-scanning direction illustrating an incidence optical system in a second embodiment according to the present invention.

FIG. 5 is a sub-scanning cross-sectional view of a second embodiment of a scanning optical system according to the present invention from a light source unit to an optical deflecting unit. In FIG. 5, like reference numerals designate elements similar to those in FIG. 2.

The second embodiment is different from the first embodiment in that each element is set such that the cross point So between optical paths of plural light beams can be located optically behind the locations Sa and Sb (on the side opposite to the side of the light source unit). Other structures and optical functions of the second embodiment are approximately similar to those of the first embodiment, and similar technical advantages can be achieved thereby.

In the second embodiment, approximately parallel incident light beams are converged by the cylindrical lenses 4a and 4b in the sub-scanning cross section, respectively, and the optical paths of the two light beams are crossed at the cross point So away from the cylindrical lenses 4a and 4b by the distance X. Linear images are hence formed at the locations Sa and Sb close to the deflecting facet 5a of the polygon mirror 5.

Although optical paths of two light beams disposed in the sub-scanning cross section are illustrated in the second embodiment, optical paths of light beams can be further disposed in the main scanning cross section as illustrated in FIG. 3 of the first embodiment, and accordingly optical paths of four light beams can be established in the structure.

Third Embodiment

Figure 6:
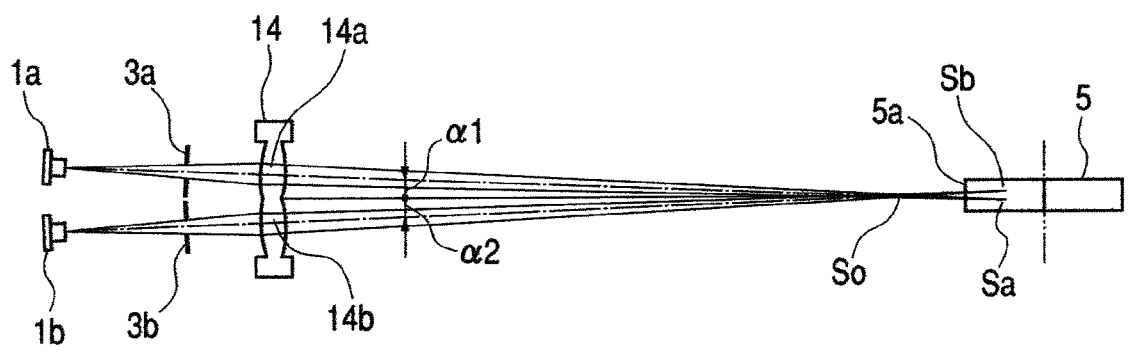
FIG. 6 is a cross-sectional view in a sub-scanning direction illustrating an incidence optical system in a third embodiment according to the present invention.

FIG. 6 is a sub-scanning cross-sectional view of a third embodiment of a scanning optical system according to the present invention from a light source unit to an optical deflecting unit. In FIG. 6, like reference numerals designate elements similar to those illustrated in FIG. 2.

The third embodiment is different from the first embodiment in that both functions of the collimator lens and the cylindrical lens are shared by anamorphic lenses 14a and 14b each serving as an optical element constituting a compound imaging element 14, and that angles •1 and •2 formed in the sub-scanning cross section between optical paths of the anamorphic lenses 14a and 14b, and a normal to the deflecting facet are made different from each other. Other structures and optical functions of the third embodiment are approximately similar to those of the first embodiment, and similar technical advantages can be achieved thereby.

To paraphrase the above discussion, the compound imaging element 14 is provided between the light source units 1a and 1b and the polygon mirror 5, and anamorphic lenses 14a and 14b having both functions of the collimator lens and the cylindrical lens constitute the compound imaging element 14. Further, the anamorphic lenses 14a and 14b are provided for respective light beams, have respective optical axes of different angles •1 and •2 in the sub-scanning cross section, and form linear images on or on places close to the deflecting facet 5a of the polygon mirror 5.

The incidence surface of each of the anamorphic lenses 14a and 14b has a rotationally symmetrical spherical shape, and the emergence surface thereof has a cylindrical shape. Powers of the anamorphic lenses 14a and 14b in the main scanning and sub-scanning cross sections are hence different from each other. Light source units 1a and 1b, stops 3a and 3b, and anamorphic lenses 14a and 14b are disposed in upper and lower stages in the sub-scanning cross section, respectively.

In the third embodiment, the anamorphic lenses 14a and 14b convert light beams emitted from the light source units 1a and 1b into approximately parallel light beams on the side of their incidence surfaces, these approximately parallel light beams are converged on the side of their light emergence surfaces in the sub-scanning cross section, respectively, and the optical paths of these two light beams are crossed at the cross point So on their ways. Linear images are thus formed at locations Sa and Sb close to the deflecting facet 5a of the polygon mirror 5.

In the third embodiment, the anamorphic lenses 14a and 14b are constructed in a united form in the sub-scanning cross section such that the compound imaging element 14 can be constructed. The compound imaging element 14 can be simultaneously produced by the molding method, such as injection molding, using the mold.

Although optical paths of two light beams disposed in the sub-scanning cross section are illustrated in the third embodiment, optical paths of light beams can be further disposed in the main scanning cross section as illustrated in FIG. 3 of the first embodiment, and accordingly optical paths of four light beams can be established in the structure.

The incidence surface of each of the anamorphic lenses 14a and 14b is not limited to a rotationally symmetrical spherical shape, and the emergence surface thereof is not limited to a cylindrical shape. They can be aspherical shapes. Further, they can have shapes formed by performing mutual bending between shapes of the incidence surface and the emergence surface such that desired powers in the main scanning and sub-scanning directions can be resultantly achieved.

Fourth Embodiment

Figure 7:
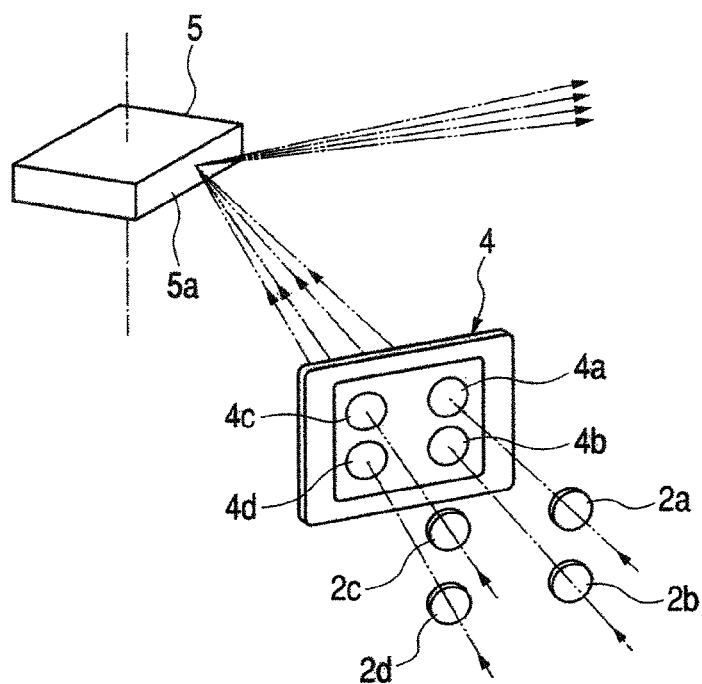
FIG. 7 is a schematic view illustrating an incidence optical system in a fourth embodiment according to the present invention.

FIG. 7 is a schematic view of a main portion of a fourth embodiment of a scanning optical system according to the present invention. In FIG. 7, like reference numerals designate elements similar to those illustrated in FIGS. 2 and 4.

The fourth embodiment is different from the first embodiment in that the apparatus is designed such that four light beams emitted from the light source units 1a to 1d are incident on a deflecting facet 5a of the polygon mirror 5. Other structures and optical functions of the fourth embodiment are approximately similar to those of the first embodiment, and similar technical advantages can be achieved thereby.

To paraphrase the above, a compound imaging element 4 is provided between light source units (not shown) and the polygon mirror 5, and four cylindrical lenses 4a to 4d provided for respective light beams constitute the compound imaging element 4 in a united form. Images of approximately parallel four light beams transmitted through collimator lenses 2a to 2d are formed as linear images on or on a place close to the same deflecting facet 5a of the polygon mirror 5 in the sub-scanning cross section, respectively.

For the convenience of simplicity, four light source units and four aperture stops are omitted in FIG. 7, and these elements are actually disposed as illustrated in FIGS. 2 and 3.

In the fourth embodiment, optical axes of the cylindrical lenses 4a and 4b, and the cylindrical lenses 4c and 4d are symmetrically disposed in the main scanning and sub-scanning directions forming angles relative to each other, respectively. In the fourth embodiment, the four cylindrical lenses 4a to 4d are constructed in a united form such that the compound imaging element 4 can be constructed. The compound imaging element 4 can be simultaneously produced by the molding method, such as injection molding, using the mold.

In this embodiment, the apparatus is constructed such that four light beams emitted from the light source units 1a to 1d are transmitted through the compound imaging element 4, and enter the same deflecting facet 5a of the polygon mirror 5. Incidence optical paths of the light beams are disposed symmetrically with respect to the sub-scanning cross section including the rotational axis of the polygon mirror 5 and the main scanning cross section perpendicular to the rotational axis of the polygon mirror 5, respectively.

In other words, incidence optical paths of four light beams incident on the polygon mirror 5 are disposed symmetrically with respect to a first cross section and a second cross section, respectively. The first and second cross sections are perpendicular to each other, and the first cross section is parallel to the rotational axis of the polygon mirror 5, while the second cross section is perpendicular to the rotational axis of the polygon mirror 5.

In the fourth embodiment, relative angles between the optical paths in the main scanning direction and the sub-scanning direction are made different from each other, but the structure is not limited thereto. The relative angles in the main scanning direction and the sub-scanning direction can be equal to each other.

Although a light beam is emitted from each of four light source units 1a to 1d (totally four light beams) in this embodiment, the structure is not limited thereto. For example, each of the four light source units 1a to 1d can be replaced by a one-chip monolithic multi-laser light source for emitting plural (m) light beams, or a conventional multi-laser light source including plural (n) laser chips and a beam compounding system. It is possible to speedily perform four-color simultaneous writing by such a multiple light source structure. In such a case, the total number of light beams is 4 m or 4 n (m and n are positive integers, respectively).

Further, four anamorphic lenses each having functions of collimation and linear image formation can be arranged so as to construct the compound imaging element, similar to the third embodiment.

Fifth Embodiment

Figure 8:
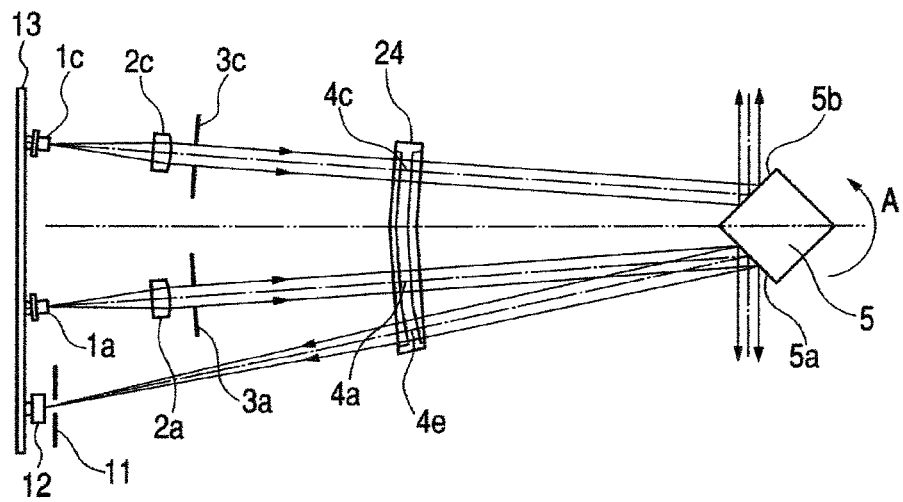
FIG. 8 is a cross-sectional view in a main scanning direction illustrating an incidence optical system in a fifth embodiment according to the present invention.
Figure 9:
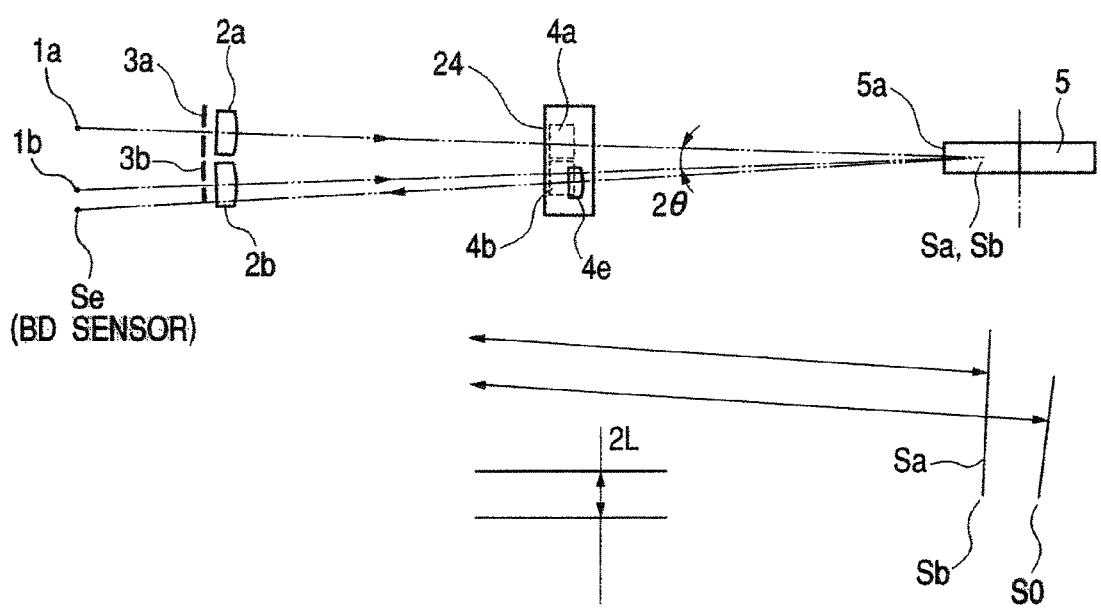
FIG. 9 is a cross-sectional view in a sub-scanning direction illustrating the incidence optical system in the fifth embodiment according to the present invention.
Figure 10:
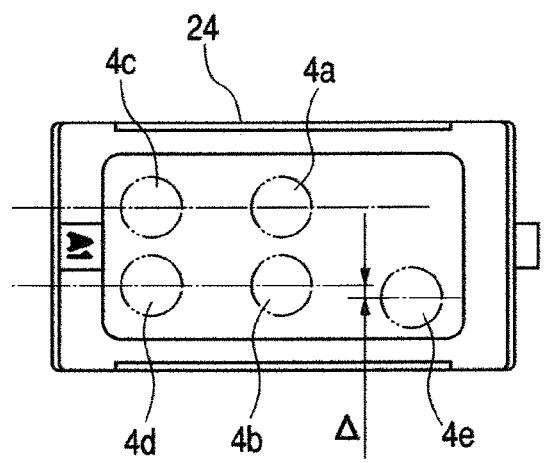
FIG. 10 is a front view illustrating a compound imaging element in the fifth embodiment according to the present invention.

FIGS. 8 to 10 are cross-sectional views illustrating a main portion of a fifth embodiment of a scanning optical system according to the present invention. FIG. 8 is a cross-sectional view in the main scanning cross section illustrating an incidence optical system from a light source unit to an optical deflecting unit. FIG. 9 is a cross-sectional view in the sub-scanning cross section illustrating the incidence optical system from the light source unit to the optical deflecting unit. FIG. 10 is a front view of a compound imaging element. In FIGS. 8 to 10, like reference numerals designate elements similar to those in FIGS. 2 to 4. In FIG. 9, each light source unit is indicated by an emission point only for simplicity, and each optical path is indicated by its principal ray only.

The fifth embodiment is different from the first embodiment in that a BD lens 4e and four cylindrical lenses 4a to 4d are constructed in a united form so as to construct a compound imaging element 24, and that incidence optical paths of two light beams are made non-parallel in the main scanning cross section. Other structures and optical functions of the fifth embodiment are approximately similar to those of the first embodiment, and similar technical advantages can be achieved thereby.

In the fifth embodiment, the BD lens 4e and the four cylindrical lenses 4a to 4d are constructed in a united form to construct the compound imaging element 24. Each of the cylindrical lenses 4a to 4d in this embodiment is comprised of an anamorphic lens having power (its local length Fs) in the sub-scanning cross section only, and the distance between the optical paths in the sub-scanning direction is set to the distance 2L. Further, the incidence surface of each of the cylindrical lenses 4a to 4d has a cylindrical shape, and its emergence surface has a plane shape.

As illustrated in FIG. 10, the BD lens 4e is disposed at a place away from the cylindrical lenses 4b and 4d of the compound imaging element 24 in the sub-scanning cross section.

[Optical Arrangement of the Incidence Optical System]

The optical arrangement of the incidence optical system from the light source units to the polygon mirror will be described with reference to FIGS. 8 and 9.

The light source unit 1c, the aperture stop 3c, the collimator lens 2c, and the cylindrical lens 4c in FIG. 8 are not illustrated in FIG. 9 since they are arranged on the side beyond the light source unit 1a, the aperture stop 3a, the collimator lens 2a, and the cylindrical lens 4b in FIG. 9. Conversely, the light source unit 1b, the aperture stop 3b, the collimator lens 2b, and the cylindrical lens 4b in FIG. 9 are not illustrated in FIG. 8 since they are arranged on the side beyond the light source unit 1a, the aperture stop 3a, the collimator lens 2a, and the cylindrical lens 4a in FIG. 8.

In this embodiment, optical paths of the two light beams emitted from the light source units 1a and 1c are made non-parallel as illustrated in FIG. 8. This holds with optical paths of the two light beams emitted from the light source units 1b and 1d.

Since the cylindrical lenses 4a and 4c illustrated in FIG. 8 are formed in a united form also in the main scanning cross section, the cylindrical lenses 4a to 4d are constructed as the compound imaging element 24 as illustrated in FIG. 10. The compound imaging element 24 can be simultaneously produced by the molding method, such as injection molding, using the mold.

As illustrated in FIG. 8, the light source units 1a and 1c, and the BD sensor 12 are disposed on a common substrate 13. Accordingly, it is possible to reduce the number of components in the apparatus, its size, and its cost. The light source units 1a and 1c, and the BD sensor 12 can be constructed separately from each other.

As can be understood from FIG. 8, the distance from the light source units 1a and 1c to the polygon mirror 5 is set shorter than that from the polygon mirror 5 to the BD sensor 12. Therefore, with respect to the optical paths formed by projection of each element on the same plane as illustrated in FIG. 9, the BD optical path is located at a lower portion of the sheet of FIG. 9. Accordingly, in this embodiment, the BD lens 4e is disposed at a location shifted by • in a height direction from the cylindrical lenses 4b and 4d as illustrated in FIG. 10.

Further, in the fifth embodiment, optical paths of upper and lower light beams incident on the polygon mirror 5 are set to cross each other on the polygon mirror 5 as illustrated in FIG. 9. For example, in the event that the upper and lower light beams are away from each other on the polygon mirror 5 as illustrated in FIGS. 2 and 5, the shift • is adjusted by a amount corresponding to this separation amount such that the BD lens 4e can be disposed on the optical path of the BD light beam.

(Image Forming Apparatus)

Figure 11:
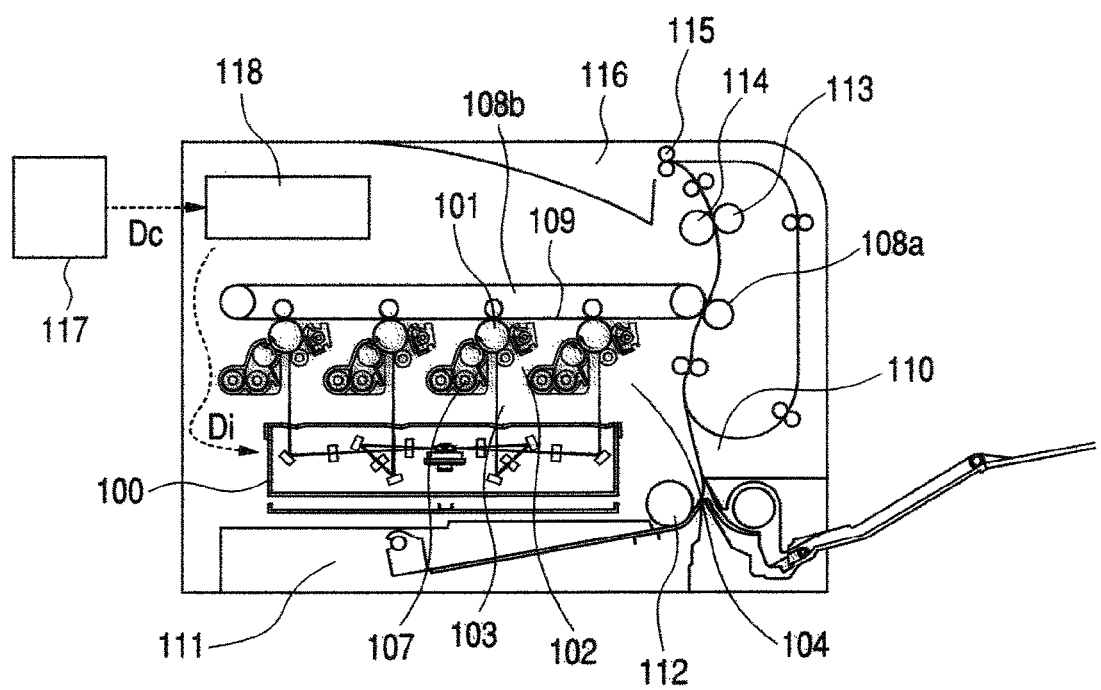
FIG. 11 is a schematic view illustrating a main portion of an image forming apparatus of a sixth embodiment according to the present invention.
Figure 12:
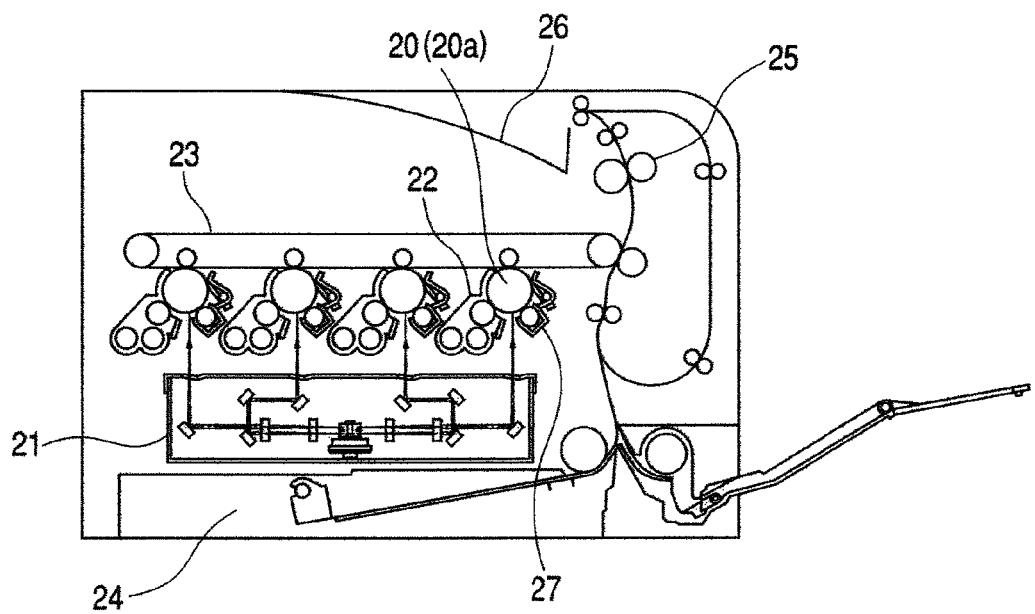
FIG. 12 is a schematic view illustrating a main portion of a conventional image forming apparatus.
Figure 13:
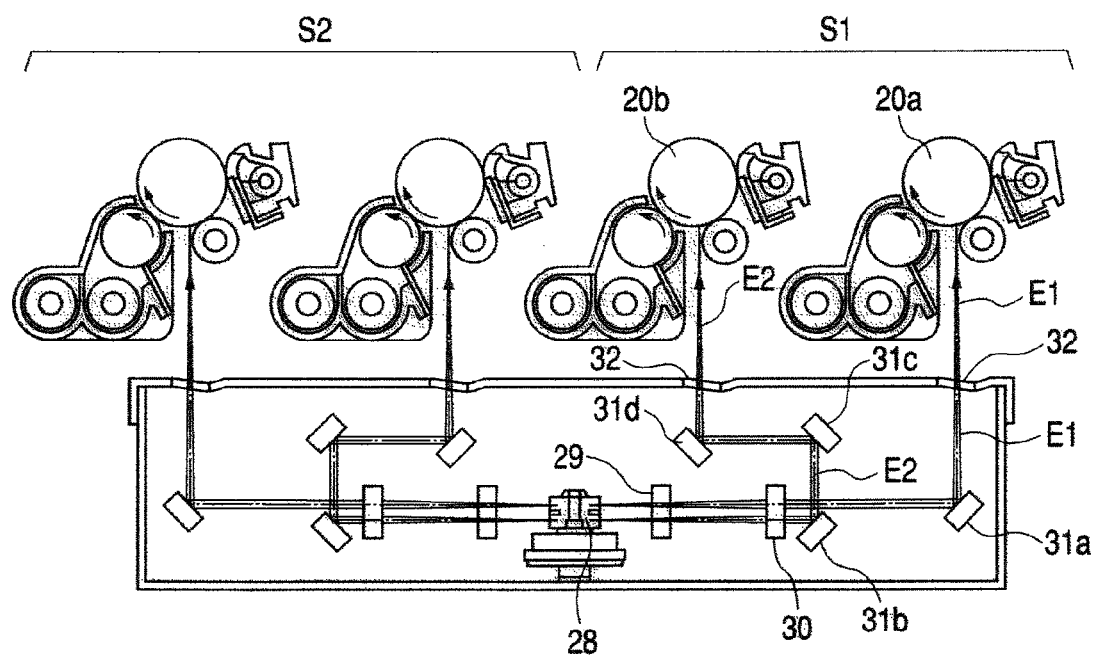
FIG. 13 is a schematic view illustrating a main portion of a conventional image forming apparatus.
Figure 14:
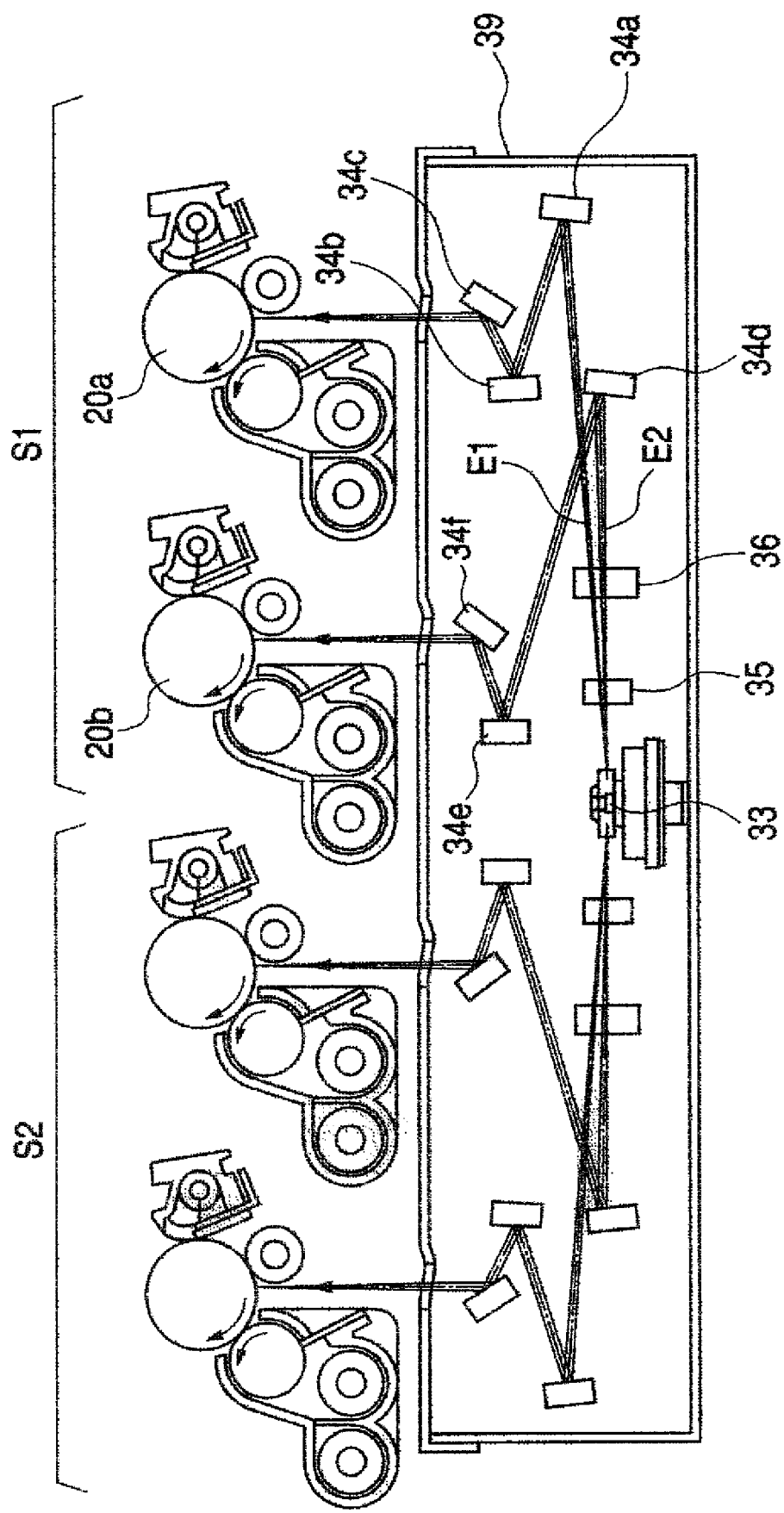
FIG. 14 is a schematic view illustrating a main portion of a conventional image forming apparatus.

FIG. 11 is a cross-sectional view in the sub-scanning cross section illustrating an embodiment of an image forming apparatus (an electrophotographic printer) using the above-discussed scanning optical system of either of the first to fifth embodiments according to the present invention.

The apparatus includes image bearing bodies 101 independently provided for respective colors of Y (yellow), M (magenta), C (cyan), and Bk (black).

In FIG. 11, reference numeral 104 designates an image forming apparatus. This image forming apparatus 104 accepts input of code data Dc from an external device 117 such as a personal computer. This code data Dc is converted into image data (dot data) Di by a printer controller 118 in the apparatus 104. This image data Di is supplied to an optical scanning unit 100 having the structure as described in either of the above-discussed first to fifth embodiments. This optical scanning unit (scanning optical system) 100 emits a light beam 103 modulated according to the image data Di for each color, and this light beam 103 scans a photosensitive surface of a photosensitive drum 101 in the main scanning direction.

The photosensitive drum 101 serving as an electrostatic latent image carrier (a photosensitive body) is rotated in a clockwise direction by a motor (not shown). With the rotation thereof, the photosensitive surface of the photosensitive drum 101 moves in the sub-scanning direction perpendicular to the main scanning direction, relative to the light beam 103. Above the photosensitive drum 101, an electrifying roller 102 for uniformly electrifying the surface of the photosensitive drum 101 is disposed so as to contact the surface. Then the surface of the photosensitive drum 101 electrified by the electrifying roller 102 is irradiated with the light beam 103 scanned by the optical scanning unit 100.

As described previously, the light beam 103 is modulated based on the image data Di for each color, and an electrostatic latent image is formed on the surface of the photosensitive drum 101 under irradiation with the light beam 103. This electrostatic latent image is developed into a toner image by a developing unit 107 disposed so as to contact the photosensitive drum 101 downstream in the rotating direction of the photosensitive drum 101 from the irradiation position of the light beam 103.

The toner image developed by the developing unit 107 is transferred onto a transferring belt 109 of an intermediate transferring member by a first transferring roller (a transferring unit) 108a provided facing the photosensitive drum 101 under the photosensitive drum 101. Similarly, images of other three colors are formed on the transferring belt 109, and a four-color composite image is formed on the transferring belt 109. Further, the image is transferred onto a sheet 110, which is a transferring material, by a second transferring roller (a transferring unit) 108b. Sheets 110 are stored in a sheet cassette 111 under the optical scanning unit 100. A sheet feed roller 112 is disposed at an end of the sheet cassette 111, and feeds each sheet 110 in the sheet cassette 111 into a conveyance path.

The sheet 110 with the transferred unfixed toner image is further conveyed to a fixing unit. The fixing unit is comprised of a fixing roller 113 having a fixing heater (not illustrated) inside and a pressure roller 114 disposed in pressure contact with the fixing roller 113. The fixing unit heats the sheet 110 thus conveyed from the transferring portion, while pressing the sheet 110 in a pressure contact portion between the fixing roller 113 and the pressure roller 114, to fix the unfixed toner image on the sheet 110. Sheet discharge rollers 115 are further disposed behind the fixing unit to discharge the fixed sheet 110 to the outside of the image forming apparatus 104.

Although not illustrated in detail in FIG. 11, a print controller 118 also performs control of each section in the image forming apparatus, control of the polygon motor, etc., in the optical scanning unit 100, and positional alignment (registration) of the four color images, in addition to the conversion of data described above.

According to the present invention, as described in the foregoing, the incidence optical paths of plural light beams incident on the deflecting unit are disposed symmetrically with respect to the plane including the rotational axis of the deflecting unit, and the plane perpendicular to the rotational axis of the deflecting unit, respectively. Accordingly, a scanning optical system capable of reducing the number of its components and its size with a simple construction, and an image forming apparatus using the scanning optical system can be achieved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A scanning optical system which includes:
a plurality of light source means; and
a polygon mirror which deflects and scans a plurality of light beams which are respectively emitted from the plurality of light source means and which are obliquely incident on a sub-scanning cross section with respect to a line normal to a deflecting facet of the polygon mirror, wherein the plurality of light beams deflected and scanned by the deflecting facet of the polygon mirror are imaged on a plurality of different scanned surfaces,
wherein a plurality of optical elements are respectively provided for the plurality of light source means, and are constructed in a united form to form a compound imaging element, said compound imaging element being disposed in the optical paths between the plurality of light source means and the polygon mirror, wherein the plurality of optical elements respectively guide the plurality of light beams emitted from the plurality of light source means onto the deflecting facet of the polygon mirror,
wherein in the sub-scanning cross section, optical axes of two optical elements among the plurality of optical elements are non-parallel and are provided from different directions with respect to a line normal to the deflecting facet of the polygon mirror,
wherein the plurality of optical elements constituting the compound imaging element respectively form linear images of the light beams, along a main scanning direction, on the deflecting facet of the polygon mirror, and
wherein the compound imaging element includes a first compound optical element formed by the optical elements which make the plurality of light beams incident on a first deflecting facet among deflecting facets of the polygon mirror, and includes a second compound optical element formed by the optical elements which make the plurality of light beams incident on a second deflecting facet among the deflecting facets of the polygon mirror.

2. A scanning optical system according to claim 1, wherein each of the optical elements constituting the compound imaging element has different powers in the sub-scanning cross section and in the main scanning cross section.

3. A scanning optical system according to claim 1, wherein one of an incidence surface and an emergence surface of each of the optical elements is an anamorphic surface and the other is a rotationally symmetric surface or a plane surface.

4. An image forming apparatus comprising:
a scanning optical system according to claim 1;
a photosensitive body disposed at one of the scanned surfaces;
developing means for developing as a toner image an electrostatic latent image which is formed on the photosensitive body by the light beam scanned by the scanning optical system;
transferring means for transferring the developed toner image onto a transferring material; and
fixing means for fixing the transferred toner image on the transferring material.

5. An image forming apparatus comprising:
a scanning optical system according to claim 1; and
a printer controller for converting code data input from an external apparatus into image signals to supply the image signals to the scanning optical system.

6. A scanning optical system according to claim 1, wherein in the sub-scanning cross section, optical axes of two optical elements among the plurality of optical elements are symmetrically provided with respect to a line normal to the deflecting facet of the polygon mirror.

7. A scanning optical system according to claim 1, wherein each of the optical elements constituting the compound imaging element is a cylindrical lens having power in a sub-scanning cross section.

* * * * *